United States Patent
Spevacek (10) Patent No.: US 6,614,728 B2
(45) Date of Patent: Sep. 2, 2003

(54) TIME-TEMPERATURE INTEGRATING INDICATOR

(75) Inventor: John A. Spevacek, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/952,965

(22) Filed: Sep. 14, 2001

(65) Prior Publication Data

US 2003/0053377 A1 Mar. 20, 2003

(51) Int. Cl.$^7$ .......................... G04C 17/00; G01K 3/00; G01K 1/02
(52) U.S. Cl. .................... 368/327; 374/100; 374/102; 116/216
(58) Field of Search ................. 368/327; 374/100, 374/102, 106, 159–162; 116/216, 217–219

(56) References Cited

U.S. PATENT DOCUMENTS

| | | |
|---|---|---|
| 2,532,011 A | 11/1950 | Dahlquist et al. |
| 4,428,321 A | 1/1984 | Arens |
| 4,457,252 A | 7/1984 | Manske |
| 4,792,584 A * | 12/1988 | Shiraki et al. ............... 524/100 |
| 4,973,513 A | 11/1990 | Riedel |
| 5,254,473 A * | 10/1993 | Patel ........................... 116/216 |
| 5,667,303 A | 9/1997 | Arens et al. |
| 5,997,927 A * | 12/1999 | Gics ........................... 116/207 |
| 6,244,208 B1 | 6/2001 | Qiu et al. |
| 6,395,376 B1 * | 5/2002 | Cooley ........................ 428/195 |

OTHER PUBLICATIONS

"Handbook of Pressure Sensitive Technology", Third Edition, Donatas Satas editor, Satas & Associates, Warwick, RI, 1999, pp. 609–621.

* cited by examiner

Primary Examiner—David Martin
Assistant Examiner—Michael L. Lindinger
(74) Attorney, Agent, or Firm—Christopher D. Gram; Nancy M. Lambert (57) ABSTRACT

The present invention provides a time-temperature integrating indicator having an amorphous material in operable contact with a porous matrix, wherein the amorphous material only migrates into the porous matrix at or above a predetermined temperature. Use of the invention simplifies monitoring of the cumulative temperature exposure of the product because no additional actuation step is required. The indicator is especially useful in monitoring the cumulative time-temperature exposure of a perishable product for a short period of time at an abusive temperature.

41 Claims, 1 Drawing Sheet

TIME-TEMPERATURE INTEGRATING INDICATOR

BACKGROUND OF THE INVENTION

The useful life of a perishable product is a function of its cumulative time-temperature exposure—a combination of the temperature to which a product is exposed and the duration of the exposure. Product degradation generally occurs more quickly at higher temperatures than at lower temperatures. Therefore, a perishable product will have a longer useful life if it is exposed to lower temperatures than if it is exposed to higher temperatures. Perishable products susceptible to degradation due to cumulative time-temperature exposure include, but are not limited to, food, food additives, chemicals, biological materials, drugs, cosmetics, photographic supplies and vaccines.

Many manufacturers mark their products with printed expiration dates in an attempt to provide an indication of when the useful life of a perishable product lapses. However, these dates are only estimates and may be unreliable because they are based on assumptions about the thermal history of the product that may not be true with respect to the particular unit of product in the package on which the expiration date appears. Specifically, manufacturers compute expiration dates by assuming that the product will be kept within a specified temperature range during the product's useful life. However, the manufacturer cannot always predict or control the temperature exposure of a product through each step of the supply chain that delivers the product to the consumer. If the product is actually exposed to temperatures higher than those on which the expiration date is based, the perishable product may degrade or spoil before the printed expiration date. When this happens, the expiration date may mislead the consumer into believing that the perishable product is still usable when, in fact, its useful life has lapsed.

A time-temperature integrating indicator that provides a visually observable indication of cumulative time-temperature exposure is reported in U.S. Pat. No. 5,667,303, issued to Arens et al. (the '303 patent). The device of the '303 patent can monitor the cumulative time-temperature exposure of a single unit of a perishable product because the device can be attached to the product or product packaging. This provides the consumer with the benefit of being able to monitor the useful life of each individual unit from a common manufacturing lot of a perishable product. Because each unit may have a cumulative time-temperature exposures distinct from other units in the lot, the device of the '303 patent can provide a more particularized and more accurate indication of the product's useful life than a printed expiration date common to each unit in a manufacturing lot.

The device of the '303 patent includes a first laminate wherein a substrate is coated with an opaque, porous matrix, a second laminate having a backing material coated with a viscous material (typically described and exemplified in the '303 patent as a viscoelastic pressure sensitive adhesive), and an actuating means for activating the indicator. The viscous material and the porous matrix have the same, or approximately the same, index of refraction. Upon actuation, i.e., bringing the viscous material in contact with the porous matrix, the viscous material migrates into the porous matrix at a temperature-dependant rate. As microvoids of the opaque, porous matrix become filled with the viscous material, the porous matrix becomes transparent. As the matrix becomes transparent, a latent visually observable indication may become visible. Typically, the viscous material begins migrating into the porous matrix as soon as the two laminates are put in contact with one another.

The visually observable indication in the device of the '303 patent is designed to occur when the cumulative time-temperature exposure of the device equals or exceeds the cumulative time-temperature exposure required to cause one or more changes in the perishable product sufficient to end the product's useful life. Such changes include, but are not limited to, product deterioration, spoilage and loss of chemical or biological activity. The viscous material used in the indicator may be selected so that the runout time of the indicator, i.e., the time needed for the indicator to provide the visually observable indication, matches the time needed for the monitored change in the perishable product to occur.

The rate of degradation at a given temperature varies from product to product. Variation in the rate of degradation with respect to changes in temperature is also product-dependent; some products show a greater increase in the rate of spoilage for a given temperature increase than other products. Two measures for matching the temperature-dependent rates of change of the indicator and the perishable product are $Q_{10}$ (an indication of how much faster a reaction occurs in response to a 10° C. increase in temperature) and Ea (activation energy). As described in detail in the '303 patent, one skilled in the art can use either the $Q_{10}$ or Ea of a particular perishable product and known viscous materials in order to select a viscous material appropriate for use in an indicator for monitoring the particular perishable product.

One characteristic of the device reported in the '303 patent is that the material employed as the viscous material begins migrating into the porous matrix as soon as the two laminates are put in contact with one another, i.e., upon completion of the actuation step. If the actuation step is omitted or delayed, the device may fail to indicate when the cumulative time-temperature exposure of the perishable product has exceeded a predetermined maximum. Conversely, if the actuation step occurs prematurely, the indicator may run out while the perishable product has useful life remaining, thereby creating waste. Thus, the device of the '303 patent requires coordination between actuating the indicator and the initial exposure of the perishable product to potentially damaging temperatures in order to have the device provide an accurate indication of the product's fitness for use. For some of the indicators reported in the '303 patent, special or elaborate actuating means are required that could make the indicator more difficult to use, add to the cost of manufacturing, or both.

Furthermore, the indicators reported in the '303 patent and elsewhere generally are designed to monitor the useful life of perishable products at cold temperatures over an extended period of time, e.g., several months or more. However, such indicators may not be suitable for monitoring a very short exposure (e.g., between about 1 and 24 hours) of the product to an abusive temperature (e.g., room temperature or higher). Consequently, if a perishable product is exposed for a short period of time to such abusive temperatures, its useable life may be shorter than the runout time of an indicator keyed to the product's rate of change at lower temperatures. Thus, at abusive temperatures, the useful life of the product may lapse prior to the device indicating that the product is no longer fit for use.

SUMMARY OF THE INVENTION

In light of the foregoing, the present invention provides a time-temperature integrating indicator that is not necessarily activated (i.e., is not yet put into a "running state") when the two laminates are brought together. In the present invention, amorphous viscous material only begins to substantially migrate into the porous matrix (i.e., runout time is initiated) when the indicator is exposed to a predetermined temperature. Little or no migration of the amorphous viscous material occurs when the two laminates are brought together but maintained below a predetermined temperature. Further, the present invention provides a time-temperature integrating indicator that can monitor the cumulative time-temperature exposure of a perishable product for a short period of time at an abusive temperature.

In accordance with the foregoing, the present invention provides a time-temperature integrating indicator including a) a first substrate comprising a diffusely light-reflective porous matrix disposed thereon, and b) a second substrate comprising an amorphous material disposed thereon, the amorphous material including at least about 70% tackifier, by weight, wherein when the porous matrix and the amorphous material are in contact with one another at or above a predetermined temperature, the amorphous material migrates into the porous matrix at a rate that increases with increasing temperature, and wherein migration of the amorphous material into the porous matrix provides a readable indication of cumulative time-temperature exposure.

In another aspect, the present invention provides a time-temperature integrating indicator including a) a first substrate comprising a diffusely light-reflective porous matrix disposed thereon, b) a second substrate comprising an amorphous material disposed thereon, the amorphous material including at least about 30% tackifier, by weight, and no greater than about 33% adhesive base component, by weight, wherein when the porous matrix and the amorphous material are in contact with one another at or above a predetermined temperature, the amorphous material migrates into the porous matrix at a rate that increases with increasing temperature, and wherein migration of the amorphous material into the porous matrix provides a readable indication of cumulative time-temperature exposure.

In another aspect, the present invention provides a time-temperature integrating indicator including a) a first substrate comprising a diffusely light-reflective porous matrix disposed thereon, and b) a second substrate comprising an amorphous material disposed thereon, the amorphous material including no more than about 33%, by weight, adhesive base component and at least 30%, by weight, a viscous component having a ring-and-ball softening point from about 0° C. to about 140° C., wherein when the porous matrix and the amorphous material are in contact with one another at or above a predetermined temperature, the amorphous material migrates into the porous matrix at a rate that increases with increasing temperature, and wherein migration of the amorphous material into the porous matrix provides a readable indication of cumulative time-temperature exposure.

In another aspect, the present invention provides a time-temperature integrating indicator system for monitoring the deterioration of an object having separate deterioration profiles at about storage temperatures and at abusive temperatures. The system includes a plurality of indicators, each designed to provide a readable indication of cumulative time-temperature exposure of the object at a different predetermined temperature.

The present invention also provides a method of providing a readable indication of the cumulative time-temperature exposure of an object including the steps of a) providing a time-temperature integrating indicator including a first substrate having a diffusely light-reflective porous matrix disposed thereon and a second substrate comprising an amorphous material disposed thereon, b) potentiating the indicator by placing the amorphous material in contact with the porous matrix such that when the indicator is at or above the predetermined temperature, the amorphous material migrates into the porous matrix at a rate that increases with increasing temperature, thereby providing a readable indication of cumulative time-temperature exposure, and c) mounting the indicator on the object. The indicator may be potentiated prior to or after mounting the indicator on the object.

In another aspect, the present invention provides an indicator tape for use in a time-temperature indicator including a substrate and an amorphous material disposed upon the substrate.

DETAILED DESCRIPTION OF THE INVENTION

The present invention provides a time-temperature integrating indicator having an amorphous material in operable contact with a porous matrix, wherein the amorphous material migrates into the porous matrix at or above a predetermined temperature. As used herein, "in operable contact" means that the amorphous material and porous matrix are in direct contact with each other, but that little or no migration of the amorphous material into the porous matrix occurs below a predetermined temperature. Therefore, use of the invention simplifies monitoring of the cumulative time-temperature exposure of the product because no special or elaborate actuation means is required. Also, for the present invention, the migration of the amorphous material may be "suspendable" when the indicator is exposed to temperatures that fluctuate above and below the predetermined temperature. Thus, migration of the amorphous material may be suspended when the indicator is exposed to temperatures below a predetermined temperature and migration may resume when and if the indicator is reexposed to temperatures at or above the predetermined temperature.

As used herein, "cumulative time-temperature exposure" means the sum of a temperature-weighted time exposure at or above a predetermined temperature and includes the entire temperature exposure history of a product from the time the indicator is first placed on the product to be monitored until the indicator provides a readable indication. Therefore, this exposure history may include "non-running" periods when the indicator is exposed to temperatures below the predetermined temperature and "running" periods when the indicator is exposed to temperatures at or above the predetermined temperature.

When the amorphous material and porous matrix are in contact with one another below a predetermined temperature (generally the softening point, Tg, of the amorphous material), then the amorphous material is in a glass-like or glassy solid state and, consequently, there is little or no migration of the amorphous material into the porous matrix. However, when the temperature of the indicator equals or exceeds the predetermined temperature, then the amorphous material transforms from its glassy state to a viscous liquid state and begins to migrate into the porous matrix at a rate that increases with increasing temperature. The transition of the amorphous material from a glassy state (below its Tg) to a liquid state (above its Tg) may be reversible. In other words, amorphous material that has transformed from a glassy state into a liquid state when the exposure temperature has risen above its Tg can transform back into a generally uniform glassy state when the exposure temperature drops below its Tg.

If the indicator is exposed to temperatures at or above the Tg of the amorphous material for a sufficient period of time, the indicator provides a readable indication of cumulative time-temperature exposure. By selecting appropriate amorphous materials, it is possible to provide time-temperature indicators especially useful for monitoring a short exposure (e.g., 1 to 24 hours) of a perishable product to abusive temperatures (e.g., at or above room temperature).

Figure 1A:
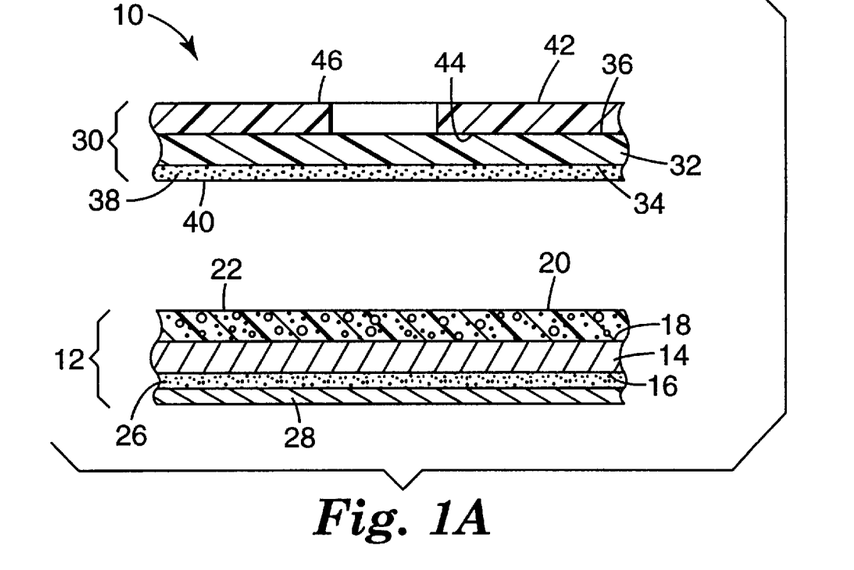
FIG. 1A is a cross-sectional view of a cumulative time-temperature indicator of the present invention in a non-joined state.
Figure 1B:
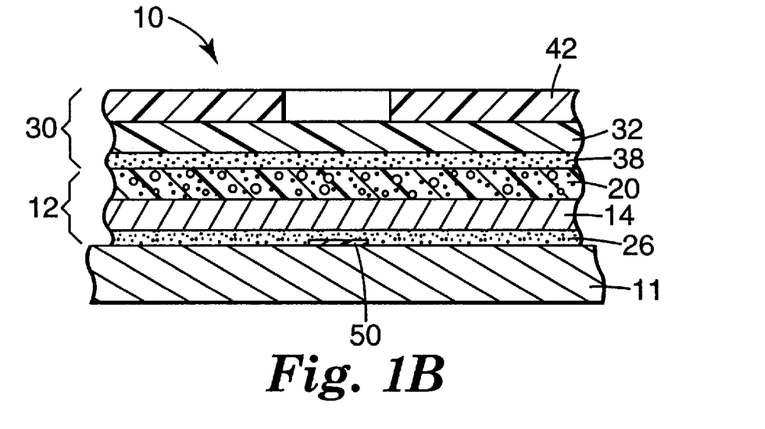
FIG. 1B is a cross-sectional view of a cumulative time-temperature indicator of the present invention in a joined state.

One embodiment of the present invention is the time-temperature integrating indicator 10 illustrated in FIGS. 1A and 1B. The indicator 10 can be used to monitor a change in an object 11 that is dependent on cumulative time-temperature exposure. The object 11 may be any object, but is typically a perishable item subject to change in response to cumulative time-temperature exposure that limits the useful life of the product. Such perishable items include, but are not limited to, foods, drugs, cosmetics, photographic supplies and vaccines. The indicator 10 may provide a readable indication of product fitness or, alternatively, non-fitness when the cumulative time-temperature exposure of the indicator corresponds to a change in the object 11 such as degradation, spoilage or loss of activity (collectively, herein, "deterioration"). The readable indication may be visually observable, instrument-readable, or both.

The indicator 10 includes a first laminate 12 and a second laminate 30. The first and second laminates may be out of contact with one another, as shown in FIG. 1A, or joined together in operable contact with one another as shown in FIG. 1B. The first and second laminates may be joined by any suitable means, whether mechanically or manually, for example by applying the second laminate 30 to the first laminate 12. This joining may optionally include means to apply the first laminate 12 to the object 11 to be monitored. Prior to joining, the first and second laminates may be stored apart almost indefinitely. Alternatively, the first and second laminates may be joined, stored almost indefinitely at a temperature below a predetermined temperature, and then applied to the object 11.

The first laminate 12 includes a generally planar first substrate 14 having a first side 18 and a second side 16. A diffusely light reflective porous matrix 20 is provided on the first side 18 of the substrate 14 and includes an exposed surface 22. The first laminate may include a means for mounting the indicator 10 to an object 11, the time-temperature exposure of which is to be monitored. Affixing the indicator 10 directly onto the object 11 to be monitored allows the indicator to be exposed to the same time-temperature history as the object being monitored. This time-temperature history may include periods below and above the predetermined temperature.

One means of mounting the indicator 10 to an object 11 is illustrated in FIG. 1A. An adhesive layer 26 may be provided on the second side 16 of the first substrate 14. A release liner 28 may be releasably adhered to the adhesive layer 26. The adhesive layer 26 may be a pressure-sensitive adhesive such as any of the pressure sensitive adhesives well known in the art. Alternatively, the indicator may be affixed to the object 11 by any other suitable means. More accurate monitoring of the time-temperature exposure of the object 11 may be possible when the indicator 10 is exposed to the same temperature history as the object 11.

The porous matrix 20 on the first substrate 14 may be any suitable microporous, diffusely light-reflective layer that can be made increasingly translucent or transparent by filling its voids with material having an index of refraction close to that of the matrix. Materials suitable for use as the first substrate 14, porous matrix 20 and methods for constructing the first laminate 12 are reported in U.S. Pat. No. 5,667,303.

Second laminate 30 includes a generally planar light transmissive second substrate 32 having a first side 34 and second side 36. As used herein, light transmissive means that the second substrate 32 is sufficiently light transmissive or translucent to allow a user of the indicator 10 to read, whether visually or instrument-aided, the indication of cumulative time-temperature exposure through the second substrate 32. The second substrate 32 may be translucent, transparent or nearly transparent. A layer of light transmissive amorphous material 38 is provided on the first side 34 of the second substrate 32 and includes an exposed surface 40. The first side 34 of the substrate may be treated to enhance adhesion of the amorphous material 38.

The second laminate 30 may optionally include a light transmissive release backing 42 having a first surface 44 and a second surface 46. When present, the release backing 42 is disposed on the second side 36 of the second substrate 32. The release backing 42 may be affixed to the second side 36 of the substrate, for example, with a pressure sensitive adhesive or by thermal lamination with a heat-activated adhesive. When present, the release backing 42 has an exposed second surface 46 that may include a release coating. When the release backing is not present, a release coating may be disposed on the second side 36 of the second substrate 32. In either case, the release coating permits the second laminate 30 to be wound upon itself during storage without a release liner because the release coating will maintain protective contact with the exposed surface of the amorphous material 40. Suitable release coatings include the siloxane- and acrylic-based compounds reported in U.S. Pat. No. 4,973,513, issued to Riedel, and the water-insoluble hydrophobic urethane (carbamate) copolymer of polyvinyl alcohol and octadecyl isocyanate reported in U.S. Pat. No. 2,532,011, issued to Dahlquist et al.

The light transmissive second substrate 32 may include any suitable material such as glass, cellophane, or film such as a transparent film of biaxially oriented polyethylene terphthalate or biaxially oriented polypropylene. When flexibility or conformance to a contour is desired, the second substrate 32 may include a film such as low density polyethylene. The second substrate 32 may be of any suitable thickness; thicknesses ranging from about 0.01 mm to about 0.125 mm have been identified as having general utility, although substrates with greater or less thickness may be used. The optional release backing 42 may include any suitable material and construction, including any of those described above in reference to the second substrate 32.

The indicator 10 is illustrated in its joined state in FIG. 1B. The joined indicator 10 is constructed by placing at least a portion of the exposed surface 22 of the porous matrix 20 in contact with at least a portion of the exposed surface 40 of the amorphous material 38 and maintaining that contact. In this regard, the term "exposed" refers only to the state of surfaces 40 and 22 immediately prior to being joined.

During manufacture, transport, storage and the like, the exposed surfaces 40 and 22 may be covered or uncovered while the indicator 10 is in its non-joined state (FIG. 1A).

So long as the joined indicator 10 is maintained below a predetermined temperature, the amorphous material 38 does not migrate into the porous matrix 20 sufficiently to create a readable indication of the time-temperature exposure of the indicator 10. Thus, the joined indicator 10 may be applied to a product either at or prior to the time during which cumulative time-temperature exposure is to be monitored. When the joined indicator 10 is exposed to temperatures at or above a predetermined temperature, the amorphous material 38 migrates into the porous matrix 20 at a rate that increases with increasing temperature. The predetermined temperature is generally about the same as the Tg of the amorphous material and is defined herein as the running temperature of the indicator. Below the running temperature, there is insufficient migration of the amorphous material 38 into the porous matrix 20 to create a readable indication of the time-temperature exposure of the indicator 10.

As the amorphous material 38 migrates into the porous matrix 20, the indicator 10 is in the "running state." Once an indication of the cumulative time-temperature exposure becomes readable, as described in greater detail below, the indicator 10 is in the "runout" state. The period beginning when the indicator 10 enters the running state and ending when the indicator 10 is in the runout state is defined as the "running time" or "runout time" of the indicator.

The indicator 10 may be designed to correspond to the known deterioration characteristics of a particular object, i.e., the object's deterioration profile. For example, different products may begin to deteriorate at different temperatures and, furthermore, may deteriorate at varying rates at different temperatures. If an appropriate amorphous material 38 is selected for the indicator 10, then migration of the amorphous material 38 into the porous matrix 20 will begin at about the temperature at which the product begins to deteriorate and will provide a readable indication of cumulative time-temperature exposure at about the time that the product's shelf life expires.

The indicator 10 may be designed to have a runout time that approximates the time required for the product being monitored to deteriorate. The amorphous material 38 determines the running temperature and the runout time for each indicator. Thus, the amorphous material 38 may be selected to provide indicators suitable for monitoring the cumulative time-temperature exposure of a wide variety of products. For certain embodiments of the present invention, the amorphous material is selected such that the running temperature (typically about the Tg of the amorphous material) is above the normal storage temperature of the product to be monitored. Additionally, the amorphous material may have viscosity characteristics such that when the indicator, and therefore the product, is subjected to abusive temperatures the runout time will be relatively short, e.g., typically from about one to about 24 hours, or more typically from about 4 to about 12 hours. For example, a product may be stored for 3 months at −10° C. with no significant deterioration, but the same product may significantly deteriorate if it is exposed to a temperature of 22° C. for 4 hours. For such a product, an indicator of the present invention could be selected with an amorphous material having a running temperature (Tg) of 0° C. and a runout time of 4 hours at 22° C. Thus, the indicator would provide a readable indication of the time-temperature history of the product if exposed to a temperature of 22° C. for 4 hours. However, the indicator would not reach the runout state during storage for 3 months at −10° C. or if the product was subjected to a brief exposure (e.g., 30 minutes) to a temperature of 22° C. Additionally, if the indicator is returned to temperatures below the Tg of the amorphous material after a brief exposure above the Tg, the amorphous material is able to transform back from a liquid state to a glassy state, thereby suspending further migration of the amorphous material into the porous matrix unless and until the indicator once again is exposed to a temperature of at least 0° C.

For purposes of this invention, an abusive temperature is defined as a temperature above the normal storage temperature of a product and a temperature at which the product may deteriorate at a rapid rate. Typically, an abusive temperature is at least 5° C. greater than the normal storage temperature and more typically at least 10° C. greater than the storage temperature. However, the difference between storage temperature and an abusive temperature for a particular product may be less than 5° C. or greater than 10° C. and is ultimately determined by the deterioration characteristics of the product. Therefore, depending upon the product being monitored, the abusive temperature may range from about 0° C. to about 100° C. For many products, room temperature (about 20° C. to about 30° C.) may be considered to be an abusive temperature.

In the running state, the amorphous material 38 migrates into the porous matrix 20 at a temperature-dependent rate, gradually filling the microvoids present in the porous matrix 20. As the microvoids of the porous matrix 20 become filled with the amorphous material 38, the porous matrix 20 is transformed from opaque to a state providing a readable indication of the cumulative time-temperature exposure of the indicator 10. The porous matrix may become translucent, transparent or partially transparent.

The readable indication of cumulative time-temperature exposure may include the appearance of a latent image that was not visible before the amorphous material 38 filled the microvoids of the porous matrix 20. Latent images may be readable through the first substrate 14, porous matrix 20, amorphous material 38 and the light transmissive second substrate 32. In other embodiments, the readable indication may include a color change or the obscuring of an image that was apparent before migration of the amorphous material 38 into the porous matrix 20. In any of the described embodiments, as well as others, the readable indication of cumulative time-temperature exposure may be visually observable or instrument-readable. Instrument-readable indications of cumulative time-temperature exposure may include infrared or ultraviolet signals in addition to any of the visually observable indications described above.

The amorphous material may include any suitable material that has a refractive index in the same general range as the porous matrix and provides desired properties for migration into the porous matrix, thereby providing a runout time that corresponds to the deterioration of a given product to be monitored. Typically, a manufacturer, wholesaler, retailer or customer is concerned about the cumulative time-temperature exposure of a product above a predetermined temperature at or above which the course of product deterioration is known. If the running temperature of the indicator is selected to correspond to the temperature above which the product begins to deteriorate, then the amorphous material may be selected so that its glass transition temperature, Tg, is about the same as the desired running temperature for the indicator. The Tg for an amorphous material is the temperature at which the material changes from a glassy, non-running state to a liquid, running state.

Therefore, the amorphous material for the indicator may be selected so that its Tg corresponds to the running temperature desired for the indicator, which corresponds to the temperature at which the product begins to deteriorate. That is, the amorphous material may be selected so that it will remain in its glassy state below the temperature at which a product begins to deteriorate, for example, but will be in the liquid state at and above that same temperature.

Suitable amorphous materials of the present invention have a running temperature (Tg) that ranges from about −30° C. to about 10° C. Particularly useful amorphous materials include compositions including one or more tackifiers and, optionally, one or more plasticizers. Certain embodiments of this invention include amorphous materials including from about 30% to about 100% tackifier and from about 0% to about 70% plasticizer. Unless otherwise indicated, compositions are described herein with reference to percentages or ratios by weight. Such amorphous materials thus may be substantially free of pressure sensitive adhesive. Suitable amorphous materials include those having about 50% tackifier and about 50% plasticizer, about 70% tackifier and about 30% plasticizer, and about 75% tackifier and about 25% plasticizer.

Other embodiments of this invention include amorphous materials that may include up to about 33% of an adhesive base component and from about 30% to about 70% tackifier. For embodiments in which the amorphous material includes a component in addition to the adhesive base component and the tackifier, the additional component may be any suitable material that does not substantially interfere with the desired function of the amorphous material in the indicator. Typically, the additional component may include one or more plasticizers, but other materials also may be suitable. For example, one embodiment of the present invention includes an amorphous material including 58% tackifier, 4% adhesive base component and 38% plasticizer.

Still other embodiments of this invention include amorphous materials including at least one viscous component having a ring-and-ball softening point (R&BSP) of from about 0° C. to about 140° C., as measured by the ASTM E28-97 Test Method for Softening Point of Resins by Ring-and-Ball Apparatus. Such viscous components may or may not include tackifiers. Suitable non-tackifier viscous components specifically include xylene-formaldehyde resins and sucrose derivatives such as sucrose benzoate, but may include any viscous material having an R&BSP from about 0° C. to about 140° C. Particularly useful embodiments have runout times of from about 1 to about 24 hours, more typically from about 4 to about 12 hours; have Tg values of from about −30° C. to about 10° C.; and adhere well to the surface of the porous matrix of the indicator.

For the purpose of this of this invention, "tackifier" (i.e., one or more tackifier) is defined as a chemical composition chosen from the class of hydrocarbon resins, rosin, rosin derivatives, hydrogenated rosin esters, and combinations thereof, as described in "Handbook of Pressure Sensitive Technology", Third Edition, Donatas Satas editor, Satas & Associates, Warwick, R. I., 1999, pp 609–621. Especially useful tackifiers are tacky to light finger pressure and adhere well when applied to the surface of a porous matrix. Such tackifiers may have viscosity characteristics that make them useful in time-temperature integrating indicators that require short runout times, such as from about 1 to about 24 hours at 22° C., or even more typically from about 4 to about 12 hours at 22° C. Useful tackifiers will typically have a R&BSP of from about 0° C. to about 140° C., or more typically from about 10° C. to about 90° C., as measured by the ASTM E28-97 Test Method for Softening Point of Resins by Ring-and-Ball Apparatus. Suitable tackifiers include hydrogenated hydrocarbon tackifiers such as REGALREZ 1018 (R&BSP of 18° C., available from Hercules Chemical, Wilmington, Del.) and ESCOREZ 5380 (R&BSP of 80° C., available from Exxon Corp., Houston, Tex.). Other suitable tackifiers include hydrogenated rosin esters commercially available as FORAL 85, FORAL 105, or ABITOL E, also available from Hercules Chemical.

Inclusion of one or more plasticizers in the amorphous material may be useful to decrease the runout time of the indicator. Suitable plasticizers include USP grade mineral oil (available from Perrigo, Allegan, Mich.), hydrocarbon oils such as SHELLFLEX (available from Shell Chemical Co.), phthalate, diisononyl phthalate, allyl phthalates, ditridecylphthalates, liquid polybutenes, liquid polyacrylates, and lanolin. One or more plasticizers may be included in the amorphous material up to about 70%. Embodiments of the present invention having 25%–30% plasticizer together with 70%–75% tackifier have been shown to have particular utility.

For embodiments of the present invention including mixtures of two or more components, such as tackifiers or plasticizers, weight ratios provided herein are considered with reference to the sum of the component being considered. For example, amorphous material including 55% ESCOREZ 5380, 20% REGALREZ 1018 and 25% mineral oil is considered to be 75% tackifier (the sum of ESCOREZ 5380 and REGALREZ 1018) and 25% plasticizer.

The amorphous material optionally may include an adhesive base component such as polyisoprene, atactic polypropylene, polybutadiene, polyisobutylene, silicone, poly(ethylene/vinyl acetate) or a poly(meth)acrylate. For example, the amorphous material may include an acrylate-based adhesive such as isooctyl acrylate or isooctyl acrylate/acrylic acid pressure sensitive adhesive. Such optional adhesive base components are generally present in the amorphous material at levels less than about 33%, in certain embodiments less than about 20%, and in yet other embodiments less than about 5%.

In another aspect, the present invention provides a system for monitoring a product having more than one deterioration profile. For example, certain products may have starkly different deterioration rates at around typical storage temperatures compared to abusively high temperatures. Consequently, it may be difficult to design a single indicator that will provide accurate monitoring of the cumulative time-temperature exposure of a product at around typical storage temperatures as well as at abusively high temperatures. An indicator will have a temperature-dependent runout time characteristic of the amorphous material selected for use in the indicator. That is, the indicator will have a longer runout time at typical storage temperatures ("storage runout time") than at abusively high temperatures ("abusive runout time"). An indicator with an accurate storage runout time for a particular product may, for example, have an abusive runout time that is too long for accurate monitoring of the product at abusively high temperatures.

In order to monitor such products properly, it may be necessary to employ two or more indicators. In such an application, a first indicator may be selected to represent the deterioration profile of the product at about typical storage temperatures and a second indicator may be selected to represent the deterioration profile of the product at abusively high temperatures. In such a system, if either of the indicators shows a readable indication that the product's useful life has expired, the product is deemed unfit for use. Such a system may include a first indicator such as an indicator of the present invention (e.g., having an amorphous material with a relatively high level of tackifier) keyed to the deterioration profile of the product at abusively high temperatures. The system may further include a second indicator, which may or may not be an indicator of the present invention, keyed to the deterioration profile of the product at low temperatures. The system may include two indicators on a single device or may include applying more than one device to the object, each device including a single indicator. A system including two or more indicators to monitor a product may include indicators of the present invention for one or both of the indicators in the system.

The readable indication of time-temperature exposure of the indicator may include a latent image, an obscurable image, or any combination including a latent image and an obscurable image, such as those described and illustrated in U.S. Pat. No. 5,667,303. A latent image is any image that initially is not readable, but becomes readable as migration of the amorphous material into the porous matrix renders the porous matrix increasingly light transmissive. An obscurable image is any image that initially is readable, but becomes obscured as the porous matrix becomes increasingly light transmissive to reveal a latent image that obscures the original obscurable image. The use of latent and/or obscurable images may also be used in combination with a comparison image as described in U.S. Pat. No. 5,667,303.

The readable indication may be visually observable, instrument-readable or both. Visually observable indications include, but are not limited to, revealing a latent image, obscuring an obscurable image, effecting a color change, and use of a comparison image. Instrument-readable indications include, but are not limited to, revealing a latent image, obscuring an obscurable image, effecting a color change, use of a comparison image, creating an infrared signal, and creating an ultraviolet signal.

Any of the images described herein may be printed on the various components of the time-temperature integrating indicator by means of any known printing technique including, but not limited to, offset printing, screen printing, thermal transfer, electrophotography, flexographic printing or rotogravure printing.

In yet another aspect of the present invention, second laminate 30, in the non-joined state shown in FIG. 1A, provides an indicator tape for use in a time-temperature integrating indicator device. The indicator tape includes a backing material having on its surface an amorphous material and a barrier material. The indicator tape may be wound upon itself into a roll for storage. The amorphous material may be thus situated between the backing material and the previous layer of the roll. The barrier material may be arranged longitudinally with respect to the long axis of the tape, thereby substantially inhibiting lateral flow of the amorphous material between the backing material and a second surface with which the amorphous material is in contact, e.g., the previous layer of the roll. Alternatively, the barrier material may traverse the width of the tape, thereby substantially inhibiting the longitudinal flow of amorphous material between the backing material and a second surface. Barrier material in this configuration may be perpendicular to the long axis of the tape or at any angle with respect to the long axis of the tape suitable for a desired purpose. Suitable materials for use in the barrier material and methods for constructing a tape including a barrier material are provided in U.S. Pat. No. 6,244,208, issued Jun. 12, 2001.

All references and publications cited herein are expressly incorporated herein by reference, in their entirely, into this disclosure. Particular embodiments of this invention will be discussed in detail in the examples below and reference has been made to possible variations to the particular embodiments that are within the scope of the invention. There are a variety of alternative techniques and procedures available to those skilled in the art that would similarly permit one to successfully practice the intended invention.

EXAMPLES

The following examples are offered to aid in understanding of the present invention and are not to be construed as limiting the scope thereof. Unless otherwise indicated, all parts and percentages are by weight.

Test Methods
Runout Determination

Runout was determined at a pre-selected temperature by measuring the optical density of an indicator at an initial time (time that indicator was initially constructed) and periodically over time until the optical density reached 0.7 or greater. If the optical density was exactly 0.7, the total elapsed time was taken as the runout. If the measurement exceeded 0.7, then a linear interpolation was taken to determine the time that the optical density of 0.7 had been reached.

Glass Transition (Tg) Determination

The glass transition (Tg) of a composition sample was determined use a Rheometrics RDA-II rheometer (Rheometrics, Inc., Piscataway, N.J.). The sample was sinusoidally stressed at 1 Hertz, with the strain equal to 1%. The viscosity was measured at a wide range of temperatures so that a graphical determination of the Tg could be completed. A parallel plate sample holder, 25-mm diameter, was used. The sample was heated slightly until it could be poured from ajar. A small amount was poured onto the rheometry plate and allowed to cool before being mounted in the rheometer. The sample was heated, the upper plate was lowered to contact and stress the sample so that it flowed to fill the entire gap. The sample was then cooled and excess fluid was removed.

Starting Materials
Laminate Layer 1 (Film Coated with a "Porous Matrix")

A porous matrix composition was prepared by charging the Ingredients A–D into a basketmill. (See Table 1 for a listing of Ingredients A–J and the amounts of each ingredient used to prepare the composition.) Sufficient MEK was held back to be used during the later addition of Ingredient E. The basketmill was started and Ingredient E added at a rate sufficiently slow to avoid clumping of the batch. Following complete addition of Ingredient E, the sides of the basketmill were washed down to ensure that all particles were dispersed into the batch. The resulting batch was milled for 30 minutes, Ingredients F and G were added, and the batch was milled for an additional 60 minutes. Percent solids were adjusted to between 28–30 weight percent using MEK. Just prior to coating, Ingredients H–J were added to the batch with mixing from a propeller blade mixer and the resulting batch mixed for an additional 10–15 minutes. The porous matrix composition was coated onto 3-mil (0.076-mm) polyester film using a conventional knife-blade coater and the resulting coated film dried for 2 minutes in a 82° C. oven to afford a 0.5-mil (0.013-mm) thick layer of the composition.

The other side of the polyester film was coated with a black adhesive after the porous matrix was coated and dried. This coated film was designated Laminate Layer 1.

TABLE 1

| Ingredient | Description | Parts Added (by Weight) |
| --- | --- | --- |
| A | Methyl Ethyl Ketone (MEK) solvent | 64.4 |
| B | Toluene solvent | 39.6 |
| C | EMCOL Surfactant (Goldschmidt Chemical, Janesville, WI) | 1.4 |
| D | Phosphorylated Polyoxyalkyl Polyol ("POCA") dispersing agent (75% in toluene); prepared as described in U.S. Pat. Nos. 5,028,483 (Chernega et al.) at column 5 and 4,889,895 (Chernega et al.). | 3.7 |
| E | Aluminum Oxide (Baikalox CR 85, Baikowowski International, Charlotte, NC) | 40 |
| F | Phenoxy Resin YP50S (30% in MEK) (Tohto Kasei Co., Tokyo, Japan | 13 |
| G | MUNG Resin—a hydroxy functional polyurethane binder (25% in MEK) prepared as described in U.S. Pat. No. 4,693,930 (Kuo et al.) at column 7, lines 17–22 | 35.3 |
| H | Anti-Stat Surfactant AY100 (Cytec Industries, West Patterson, NJ) | 0.25 |
| I | Yellow Dye 125 Automate (Morton, Chicago, IL) | 0.03 |
| J | Desmodur CB55 polyisocyanate crosslinker (55% in MEK) (Bayer, New Martinsville, WV) | 4.5 |

Examples 1–4

Films Coated with a Tackifier-Mineral Oil Composition (Laminate Layers A–D)

Example 1

(Laminate Layer A)

A tackifier-mineral oil composition was prepared by mixing together 70 parts by weight of ESCOREZ 5380 tackifier (Exxon, Houston, Tex.) and 30 parts of Mineral Oil, USP grade (Perrigo, Allegan, Mich.) and heating the mixture until the tackifier melted and a homogeneous sample was obtained. The heated fluid was then coated onto clear 2-mil (0.05 mm) thick polyester film by drawing down with a heated notchbar to a 1-mil (0.025-mm) thickness. The coated film was allowed to cool and designated Laminate 2A. Prior to coating, the Tg of a sample of the tackifier-mineral oil composition was determined.

Example 2

(Laminate Layer B)

Laminate Layer B was prepared in the same way as Laminate Layer A, except that a tackifier/mineral oil ratio of 75/25, respectively, was used.

Example 3

(Laminate Layer C)

Laminate Layer C was prepared in the same way as Laminate Layer A, except that the tackifier consisted of ESCOREZ 5380 tackifier and REGALREZ 1018 tackifier (Hercules Chemical, Wilmington, Del.), and an ESCOREZ/REGALREZ/mineral oil ratio of 55/20/25, respectively, was used.

Example 4

(Laminate Layer D)

Laminate Layer D was prepared in the same way as Laminate Layer C, except that an ESCOREZ/REGALREZ/mineral oil ratio of 70/5/25, respectively, was used.

Example 5

Film Coated with a Tackifier-Mineral Oil-KRATON Composition (Laminate Layer E)

To a clean glass jar containing 60 parts of toluene was added 1.6 parts KRATON 1750 G (Shell Chemical, Houston, Tex.), 23.3 parts REGALREZ 1085 (Hercules Chemical), and 15.2 parts of Mineral Oil (USP Grade, Perrigo). The jar was sealed and shaken until the materials completely dissolved to form a uniform solution. The solution was then coated on clear 2-mil (0.05 mm) polyester film by drawing down with a notchbar to a 4-mil (0.10 mm) thickness. The coated film was then dried in a 120° C. forced air oven for 10 minutes to afford a dried coating about 1-mil (0.025 mm) thick.

Examples 6–9

Films Coated with Tackifier-Mineral Oil-KRATON Compositions (Laminate Layers F–I)

Laminate Layers F–I (Examples 6–9) containing various levels of REGALREZ 1085 tackifier, Mineral Oil, and KRATON 1750 G were prepared as described for Laminate Layer E (Example 5). The relative quantities of each component are shown in Table 3.

Example 10

Film Coated with a Tackifier-Polyacrylate Composition (Laminate Layer J)

A polyacrylate was prepared as follows in the manner generally taught by Ulrich, Re 24,906. Isooctyl acrylate (25.5 parts), acrylic acid (0.5 parts), ethyl acetate (52 parts), and heptane (22 parts), and VAZO 64 initiator (0.1 parts) (Dupont Chemical, Wilmington Del.) were added to a clean glass jar. The jar was sealed and heated to 65° C. for 24 hours during which time polymerization of the monomers took place. After cooling to room temperature, 10 parts of the polyacrylate solution and 6.07 parts of FORAL 85 tackifier (Hercules Chemical) were added to a separate clean glass jar, the jar was sealed and shaken until the tackifier was completely dissolved. Additional heptane was added as needed to thin the tackifier/polyacrylate solution to a desirable viscosity. The solution was then coated onto a 2-mil (0.05 mm) clear polyester film and drawn down with a notchbar to a thickness of 4-mils (1.0 mm). The coating was then dried in a forced air oven at 120° C. for 10 minutes to afford a 1-mil (0.025 mm) thick coating.

Examples 11–12

Films Coated with Tackifier-Polyacrylate Compositions Laminate Layers K–L

Laminate Layers K–L (Examples 11–12) containing various levels of FORAL 85 tackifier and polyacrylate component were prepared as described for Laminate Layer J (Example 10). The relative quantities of each component are shown in Table 3.

Examples 13–24

Time-Temperature Integrating Indicators

Time-temperature integrating indicators were prepared by individually laminating the coated sides of Laminate Layers A–L (Examples 1–12) to the porous matrix coated side of Laminate Layer 1 by placing the layers in contact with each other and rolling down with hand pressure. The resulting indicators (Examples 13–24) were then placed in a controlled temperature environment for runout determination. A visually observable indicator of time-temperature exposure was provided as the tackifier-containing compositions of Laminate Layers A–L migrated into the porous matrix of Laminate 1, thereby revealing the black adhesive coating of Laminate 1.

EVALUATIONS

The results of Tg value determinations for the various tackifier/mineral oil-containing compositions and of runout value determinations at 22.2° C. and at 15° C. for the time-temperature integrating indicators (Examples 13–16) are presented in Table 2.

TABLE 2

Runout Results for Time-Temperature Integrating Indicators

| | Tackifier-Containing Composition of Laminate Layers A–D | | | | | Runout (Hours) | |
|---|---|---|---|---|---|---|---|
| Ex. | Tackifier | % | Other | % | Tg (° C.) | 22.2° C. | 15° C. |
| 13 | ESCOREZ 5380 | 70 | Mineral Oil | 30 | −15 | 1.6 | 14.4 |
| 14 | ESCOREZ 5380 | 75 | Mineral Oil | 25 | 0 | 14.3 | 30.6 |
| 15 | ESCOREZ 5380 | 55 | Mineral Oil | 25 | −10 | 1.1 | 19 |
| | REGALREZ 1018 | 20 | | | | | |
| 16 | ESCOREZ 5380 | 70 | Mineral Oil | 25 | 0 | 7.7 | 50.9 |
| | REGALREZ 1018 | 5 | | | | | |

The component weight-percents for the tackifier-containing compositions used in Laminate Layers E–L and the results of runout value determinations at various temperatures for the time-temperature integrating indicators (Examples 17–24) are presented in Table 3.

Conclusions from Results

The results shown in Table 2 show the versatility of the indicators of the present invention. Examples 13 and 15 show that the runout time at 22.2° C. can be kept constant or nearly constant while the running temperature (Tg) can be adjusted by about 5° C. Examples 14 and 16 show that the running temperature can be kept constant while the runout time at 22.2° C. can differ by about a factor of 2. Together these comparisons show that it is possible to select amorphous materials with different running temperatures and with different viscosity characteristics in order to provide indicators with different runout times. This versatility is desirable because different products will have different storage temperature requirements, abusive temperature requirements and deterioration characteristics, thereby requiring indicators having various running temperatures and various running times in order to accurately monitor the deterioration of the different products.

The results in Table 3 show that replacing the Mineral Oil plasticizer in part or in total with certain polymeric materials (e.g., KRATON or polyacrylate adhesive base components) can lead to a very significant increase in runout time. For example, for Laminate Layer compositions containing 10–30% adhesive-base polymeric material, room temperature runout times were in the range of 74–7300 hours. In contrast, the results in Table 2 show that compositions containing no adhesive-base polymeric material can provide room temperature runouts in the range of 1 to 14 hours.

What is claimed is:

1. A time-temperature integrating indicator comprising:
   a) a first substrate comprising a diffusely light-reflective porous matrix disposed thereon; and
   b) a second substrate comprising an amorphous material disposed thereon, the amorphous material comprising at least about 30% tackifier, by weight;
   wherein when the porous matrix and the amorphous material are in contact with one another at or above a predetermined temperature, the amorphous material migrates into the porous matrix at a rate that increases with increasing temperature; and

TABLE 3

Runout Results for Time-Temperature Integrating Indicators

| | Tackifier-Containing Composition of Laminate Layers E–L | | | | | | Runout | |
|---|---|---|---|---|---|---|---|---|
| | | | | | | | | Time |
| Ex. | Tackifier | % | Plasticizer | % | Polymer | % | Temp. | (Hr.) |
| 17 | REGALREZ 1085 | 58 | Mineral Oil | 38 | KRATON | 4 | 22.2° C. | 0.5 |
| 18 | REGALREZ 1085 | 78 | Mineral Oil | 10 | KRATON | 12 | 22.2° C. | 74 |
| | | | | | | | 7° C. | 339 |
| 19 | REGALREZ 1085 | 77 | Mineral Oil | 7 | KRATON | 16 | 22.2° C. | 104 |
| | | | | | | | 7° C. | 407 |
| 20 | REGALREZ 1085 | 80 | Mineral Oil | 8 | KRATON | 12 | 22.2° C. | 163 |
| | | | | | | | 7° C. | 225 |
| 21 | REGALREZ 1085 | 79 | Mineral Oil | 5 | KRATON | 16 | 22.2° C. | 248 |
| | | | | | | | 7° C. | 208 |
| 22 | FORAL 85 | 70 | None | | Polyacrylate | 30 | 22.2° C. | 6140 |
| 23 | FORAL 85 | 80 | None | | Polyacrylate | 20 | 22.2° C. | 6200* |
| 24 | FORAL 85 | 90 | None | | Polyacrylate | 10 | 22.2° C. | 7300* |

*Runout Time estimated by linear extrapolation wherein migration of the amorphous material into the porous matrix provides a readable indication of cumulative time-temperature exposure in about 104 hours or less at 22° C.

2. The indicator of claim 1 wherein the readable indication of cumulative time-temperature exposure is visually observable.

3. The indicator of claim 2 wherein the visually observable indication of cumulative time-temperature exposure comprises the appearance of a latent image, the obscuring of an image, a color change, or any combination thereof.

4. The indicator of claim 1 wherein the readable indication of cumulative time-temperature exposure is instrument-readable.

5. The indicator of claim 4 wherein the instrument-readable indicator of cumulative time-temperature exposure comprises an infrared signal, an ultraviolet signal, the appearance of a latent image, the obscuring of an image, a color change, or any combination thereof.

6. The indicator of claim 1 wherein the tackifier comprises a hydrocarbon resin, a rosin, a rosin derivative, a hydrogenated rosin ester, or a combination thereof.

7. The indicator of claim 1 wherein the amorphous material further comprises an adhesive base component.

8. The indicator of claim 7 wherein the amorphous material comprises less than 20% adhesive base component, by weight.

9. The indicator of claim 8 wherein the amorphous material comprises less than 5% adhesive base component, by weight.

10. The indicator of claim 1 wherein the amorphous material further comprises a plasticizer.

11. The indicator of claim 10 wherein the plasticizer comprises mineral oil.

12. The indicator of claim 1 wherein the amorphous material comprises at least 75% tackifier by weight.

13. The indicator of claim 1 wherein the amorphous material has a Tg of about 0° C. or less.

14. The indicator of claim 13 wherein the amorphous material has a Tg of about −10° C. or less.

15. The indicator of claim 1 wherein the tackifier has a ring-and-ball softening point from about 0° C. to about 140° C.

16. The indicator of claim 1 having a runout time from about 1 hour to about 24 hours.

17. The indicator of claim 16 having a runout time from about 4 hours to about 12 hours.

18. A method of providing a readable indication of the cumulative time-temperature exposure of an object comprising:
(a) providing a time-temperature integrating indicator comprising:
i) a first substrate comprising a diffusely light-reflective porous matrix disposed thereon, and
ii) a second substrate comprising an amorphous material disposed thereon, the amorphous material comprising at least about 30% tackifier by weight;
(b) potentiating the indicator by placing the amorphous material in contact with the porous matrix such that when the indicator is at or above the predetermined temperature, the amorphous material migrates into the porous matrix at a rate that increases with increasing temperature, thereby providing a readable indication of cumulative time-temperature exposure in about 104 hours or less of exposure at or above the predetermined temperature; and
(c) mounting the indicator on the object;
wherein steps (b) and (c) may be performed sequentially in any order.

19. A time-temperature integrating indicator comprising:
a) a first substrate comprising a diffusely light-reflective porous matrix disposed thereon; and
b) a second substrate comprising an amorphous material disposed thereon,
the amorphous material including at least 30%, by weight, a viscous component having a ring-and-ball softening point from about 0° C. to about 140° C.;
wherein when the porous matrix and the amorphous material are in contact with one another at or above a predetermined temperature, the amorphous material migrates into the porous matrix at a rate that increases with increasing temperature; and
wherein migration of the amorphous material into the porous matrix provides a readable indication of cumulative time-temperature exposure in about 104 hours or less at 22° C.

20. The indicator of claim 19 wherein the readable indication of cumulative time-temperature exposure is visually observable.

21. The indicator of claim 20 wherein the visually observable indication of cumulative time-temperature exposure comprises the appearance of a latent image, the obscuring of an image, a color change, or any combination thereof.

22. The indicator of claim 19 wherein the readable indication of cumulative time-temperature exposure is instrument-readable.

23. The indicator of claim 22 wherein the instrument-readable indicator of cumulative time-temperature exposure comprises an infrared signal, an ultraviolet signal, the appearance of a latent image, the obscuring of an image, a color change, or any combination thereof.

24. The indicator of claim 19 wherein the amorphous material has a Tg of about 0° C. or less.

25. The indicator of claim 24 wherein the amorphous material has a Tg of about −10° C. or less.

26. The indicator of claim 19 having a runout time from about 1 hour to about 24 hours.

27. The indicator of claim 26 having a runout time from about 4 hours to about 12 hours.

28. A method of providing a readable indication of the cumulative time-temperature exposure of an object comprising:
(a) providing a time-temperature integrating indicator comprising:
i) a first substrate comprising a diffusely light-reflective porous matrix disposed thereon, and
ii) a second substrate comprising an amorphous material disposed thereon, the amorphous material including at least 30%, by weight, a viscous component having a ring-and-ball softening point from about 0° C. to about 140° C.;
(b) potentiating the indicator by placing the amorphous material in contact with the porous matrix such that when the indicator is at or above the predetermined temperature, the amorphous material migrates into the porous matrix at a rate that increases with increasing temperature, thereby providing a readable indication of cumulative time-temperature exposure in about 104 hours or less of exposure at or above the predetermined temperature; and
(c) mounting the indicator on the object;
wherein steps (b) and (c) may be performed sequentially in any order.

29. A time-temperature integrating indicator system comprising:
- a first indicator comprising:
  - a) a first substrate comprising a diffusely light-reflective porous matrix disposed thereon, and
  - b) a second substrate comprising an amorphous material disposed thereon,
- wherein when the porous matrix and the amorphous material are in contact with one another at or above a first predetermined temperature, the amorphous material migrates into the porous matrix at a rate that increases with increasing temperature, and
- wherein migration of the amorphous material into the porous matrix creates a first readable indication of cumulative time-temperature exposure; and
- a second indicator comprising:
  - a) a first substrate comprising a diffusely light-reflective porous matrix disposed thereon, and
  - b) a second substrate comprising an amorphous material disposed thereon,
- wherein when the porous matrix and the amorphous material are in contact with one another at or above a second predetermined temperature, the amorphous material migrates into the porous matrix at a rate that increases with increasing temperature, and
- wherein migration of the amorphous material into the porous matrix provides a second readable indication of cumulative time-temperature exposure; and
- wherein the amorphous material of the first indicator and the amorphous material of the second indicator are selected so that the first predetermined temperature is different than the second predetermined temperature.

30. A method of providing a readable indication of the cumulative time-temperature exposure of an object comprising:
(a) providing a time-temperature integrating indicator system comprising: a first indicator comprising:
  i) a first substrate comprising a diffusely light-reflective porous matrix disposed thereon, and
  ii) a second substrate comprising an amorphous material disposed thereon,
  wherein when the porous matrix and the amorphous material are in contact with one another at or above a first predetermined temperature, the amorphous material migrates into the porous matrix at a rate that increases with increasing temperature, and
  wherein migration of the amorphous material into the porous matrix provides a first readable indication of cumulative time-temperature exposure, and
  a second indicator comprising:
  i) a first substrate comprising a diffusely light-reflective porous matrix disposed thereon, and
  ii) a second substrate comprising an amorphous material disposed thereon,
  wherein when the porous matrix and the amorphous material are in contact with one another at or above a second predetermined temperature, the amorphous material migrates into the porous matrix at a rate that increases with increasing temperature, and
  wherein migration of the amorphous material into the porous matrix provides a second readable indication of cumulative time-temperature exposure;
(b) potentiating the first indicator by placing the amorphous material therein in contact with the porous matrix therein such that when the first indicator is at or above the first predetermined temperature, the amorphous material migrates into the porous matrix at a rate that increases with increasing temperature, thereby providing a first readable indication of cumulative time-temperature exposure;
(c) potentiating the second indicator by placing the amorphous material therein in contact with the porous matrix therein such that when the second indicator is at or above the second predetermined temperature, the amorphous material migrates into the porous matrix at a rate that increases with increasing temperature, thereby providing a second readable indication of cumulative time-temperature exposure; and
(d) mounting the first and second indicators on the object;
wherein steps (b), (c) and (d) may be performed sequentially in any order and wherein the first predetermined temperature is different than the second predetermined temperature.

31. The method of claim 30 wherein the amorphous material of at least one indicator comprises at least about 30% tackifier, by weight, and wherein the at least one indicator provides a readable indication of cumulative time-temperature exposure in about 104 hours or less of exposure at or above the predetermined temperature for that indicator.

32. The method of claim 30 wherein the amorphous material of at least one indicator comprises a viscous component having a ring-and-ball softening point from about 0° C. to about 140° C., and wherein the at least one indicator provides a readable indication of cumulative time-temperature exposure in about 104 hours or less of exposure at or above the predetermined temperature for that indicator.

33. An indicator tape for use in a time-temperature integrating indicator comprising:
a substrate; and
an amorphous material disposed upon the substrate, the amorphous material comprising at least about 30% tackifier, by weight, wherein when used in a time-temperature integrating indicator provides a readable indication of cumulative time-temperature exposure in about 104 hours or less of exposure at or above a predetermined temperature.

34. The indicator tape of claim 33 further comprising a barrier material disposed on the substrate.

35. An indicator tape for use in a time-temperature integrating indicator comprising:
a substrate; and
an amorphous material disposed upon the substrate, the amorphous material including at least 30%, by weight, a viscous component having a ring-and-ball softening point from about 0° C. to about 140° C., wherein when used in a time-temperature integrating indicator provides a readable indication of cumulative time-temperature exposure in about 104 hours or less of exposure at or above a predetermined temperature.

36. The indicator tape of claim 35 further comprising a barrier material disposed on the substrate.

37. The method of claim 18 wherein the indicator has a runout time from about 1 hour to about 24 hours.

38. The method of claim 37 wherein the indicator has a runout time from about 4 hours to about 12 hours.

39. The time-temperature integrating indicator system of claim 29 wherein the amorphous material of at least one indicator comprises at least about 30% tackifier, by weight, and provides a readable indication of cumulative time-temperature exposure in about 104 hours or less at 22° C.

40. The time-temperature integrating indicator system of claim 29 wherein the amorphous material of at least one indicator comprises at least about 30% tackifier, by weight, and provides a readable indication of cumulative time-temperature exposure in about 24 hours or less.

41. The time-temperature integrating indicator system of claim 29 wherein the amorphous material of at least one indicator comprises a viscous component having a ring-and-ball softening point from about 0° C. to about 140° C.

* * * * *

UNITED STATES PATENT AND TRADEMARK OFFICE
CERTIFICATE OF CORRECTION

PATENT NO. : 6,614,728 B2
DATED : September 2, 2003
INVENTOR(S) : Spevacek, John A.

It is certified that error appears in the above-identified patent and that said Letters Patent is hereby corrected as shown below:

Column 10,
Line 16, delete "ditridecylphthalates" and insert in place thereof -- ditridecyl phthalates --;

Column 12,
Line 38, delete "ajar" and insert in place thereof -- a jar --;

Column 13,
Table 1, Ingredient F, line 18, after the word "Japan" insert -- ) --;
Line 31, delete "Tackifler-Mineral" and insert in place thereof -- Tackifier-Mineral --;

Column 18,
Line 2, delete "diffuscly" and insert in place thereof -- diffusely --.

Signed and Sealed this

Twenty-eighth Day of December, 2004

JON W. DUDAS
*Director of the United States Patent and Trademark Office*